US009285230B1

(12) United States Patent
Silver et al.

(10) Patent No.: US 9,285,230 B1
(45) Date of Patent: Mar. 15, 2016

(54) METHODS AND SYSTEMS FOR DETECTING ROAD CURBS

(71) Applicant: Google Inc., Mountain View, CA (US)

(72) Inventors: David Harrison Silver, Mountain View, CA (US); David Ian Ferguson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 123 days.

(21) Appl. No.: 14/135,818

(22) Filed: Dec. 20, 2013

(51) Int. Cl.
G05D 1/00 (2006.01)
G01C 21/26 (2006.01)

(52) U.S. Cl.
CPC ...................................... G01C 21/26 (2013.01)

(58) Field of Classification Search
CPC ......... G01C 21/26; G08G 1/16; G08G 1/167; B60Q 1/0023; B60Q 9/008; G06K 9/0085; G06T 7/0075; H04W 74/0816; H04W 76/002; B60W 10/06; B60W 2550/402
USPC ............ 701/1, 301, 41, 22–28, 400; 382/103, 382/104, 406, 107; 356/4.01, 4.08
See application file for complete search history.

(56) References Cited

U.S. PATENT DOCUMENTS

| 8,099,213 B2* | 1/2012 | Zhang et al. | 701/41 |
| 8,364,334 B2* | 1/2013 | Au et al. | 701/23 |
| 2005/0202862 A1* | 9/2005 | Shuman et al. | 463/9 |
| 2010/0030473 A1* | 2/2010 | Au et al. | 701/301 |
| 2010/0054538 A1* | 3/2010 | Boon | 382/104 |
| 2010/0104199 A1 | 4/2010 | Zhang et al. | |
| 2011/0013201 A1* | 1/2011 | Scherl et al. | 356/628 |
| 2013/0066596 A1* | 3/2013 | Papas et al. | 703/1 |
| 2013/0163821 A1* | 6/2013 | You et al. | 382/104 |
| 2014/0160244 A1* | 6/2014 | Berberian et al. | 348/46 |
| 2014/0180590 A1* | 6/2014 | Stroila et al. | 702/5 |
| 2014/0195114 A1* | 7/2014 | Tseng et al. | 701/37 |
| 2014/0297069 A1* | 10/2014 | Landes et al. | 701/19 |
| 2014/0347485 A1* | 11/2014 | Zhang et al. | 348/148 |

* cited by examiner

Primary Examiner — Helal A Algahaim
Assistant Examiner — Shardul Patel
(74) Attorney, Agent, or Firm — McDonnell Boehnen Hulbert & Berghoff LLP

(57) ABSTRACT

Methods and systems for detecting road curbs are described herein. A vehicle's computing system may receive point clouds collected in an incremental order as the vehicle navigates a path. The point clouds may include data points representative of the vehicle's environment at a given timepoint and include associated position information indicative of the vehicle's position at the timepoint. Based on the associated position information in the point clouds, the computing system may process the point clouds into a dense point cloud representation and may determine features of the representation. The computing system may provide the features to a classification system that is configured to output an estimate of whether the features are representative of a road curb. Based on the output of the classification system, the computing system may determine whether the given data points represent one or more road curbs in the vehicle's environment.

20 Claims, 6 Drawing Sheets

METHODS AND SYSTEMS FOR DETECTING ROAD CURBS

BACKGROUND

Unless otherwise indicated herein, the materials described in this section are not prior art to the claims in this application and are not admitted to be prior art by inclusion in this section.

A driver may navigate a vehicle along various paths, which may often include driving the vehicle on a road. Different types of roads may include a variety of markers or barriers to assist drivers navigate vehicles safely. One type of barrier that a road may typically include is a road curb, which may exist as raised pavement at the side of the road where the boarder of the road meets the unraised road.

A road may include road curbs for a variety of reasons, such as separating the road from the roadside and discouraging drivers from parking or driving on sidewalks and lawns, for example. In addition, road curbs may also provide structural support to the pavement edge and can be used to channel runoff water from rain, or melted snow and ice into storm drains. There is also an aesthetic aspect, in that road curbs may look formal and "finished". Likewise, a driver may use road curbs while navigating a vehicle for distinguishing boundary information.

SUMMARY

The present application discloses embodiments that relate to methods and systems for detecting road curbs.

In one example, the present application describes a method. The method may comprise receiving a plurality of point clouds collected in an incremental order as a vehicle navigates a path and a given point cloud comprises data points representative of the environment of the vehicle at a given timepoint and has associated position information indicative of a position of the vehicle at the given timepoint. The method may also comprise based on respective associated position information of the plurality of point clouds, processing, by a computing device, the plurality of point clouds into a dense point cloud representation. The method may further comprise determining features of the dense point cloud representation and the features include a slope of given data points, an elevation profile of the given data points, an angle of incidence of a collection of the given data points, and a range of detection of the given data points. The method may additionally comprise providing the features to a classification system that is configured to output an estimate of whether the features are representative of a road curb, and based on an output of the classification system, determining whether the given data points represent one or more road curbs in the environment of the vehicle.

In another example, the present application describes a non-transitory computer readable medium having stored thereon executable instructions that, upon execution by a computing device, cause the computing device to perform functions. The functions may comprise receiving a plurality of point clouds collected in an incremental order as a vehicle navigates a path and a given point cloud comprises data points representative of the environment of the vehicle at a given timepoint and has associated position information indicative of a position of the vehicle at the given timepoint. The functions may also comprise based on respective associated position information of the plurality of point clouds, processing the plurality of point clouds into a dense point cloud representation. The functions may further comprise determining features of the dense point cloud representation and the features include a slope of given data points, an elevation profile of the given data points, an angle of incidence of a collection of the given data points, and a range of detection of the given data points. The functions may additionally comprise providing the features to a classification system that is configured to output an estimate of whether the features are representative of a road curb, and based on an output of the classification system, determining whether the given data points represent one or more road curbs in the environment of the vehicle.

In still another example, the present application describes a system. The system may comprise at least one processor. The system may also comprise a memory having stored thereon executable instructions that, upon execution by the at least one processor, cause the system to perform functions comprising receiving a plurality of point clouds collected in an incremental order as a vehicle navigates a path and a given point cloud comprises data points representative of the environment of the vehicle at a given timepoint and has associated position information indicative of a position of the vehicle at the given timepoint. The functions may also comprise based on respective associated position information of the plurality of point clouds, processing the plurality of point clouds into a dense point cloud representation. The functions may further comprise determining features of the dense point cloud representation and the features include a slope of given data points, an elevation profile of the given data points, an angle of incidence of a collection of the given data points, and a range of detection of the given data points. The functions may also comprise providing the features to a classification system that is configured to output an estimate of whether the features are representative of a road curb, and based on an output of the classification system, determining whether the given data points represent one or more road curbs in the environment of the vehicle.

In another example, a system is provided that comprises a means for receiving a plurality of point clouds collected in an incremental order as a vehicle navigates a path and a given point cloud comprises data points representative of the environment of the vehicle at a given timepoint and has associated position information indicative of a position of the vehicle at the given timepoint. The system may also comprise a means for, based on respective associated position information of the plurality of point clouds, processing the plurality of point clouds into a dense point cloud representation. The system may further comprise a means for determining features of the dense point cloud representation and the features include a slope of given data points, an elevation profile of the given data points, an angle of incidence of a collection of the given data points, and a range of detection of the given data points. The system may comprise a means for providing the features to a classification system that is configured to output an estimate of whether the features are representative of a road curb, and based on an output of the classification system, determining whether the given data points represent one or more road curbs in the environment of the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
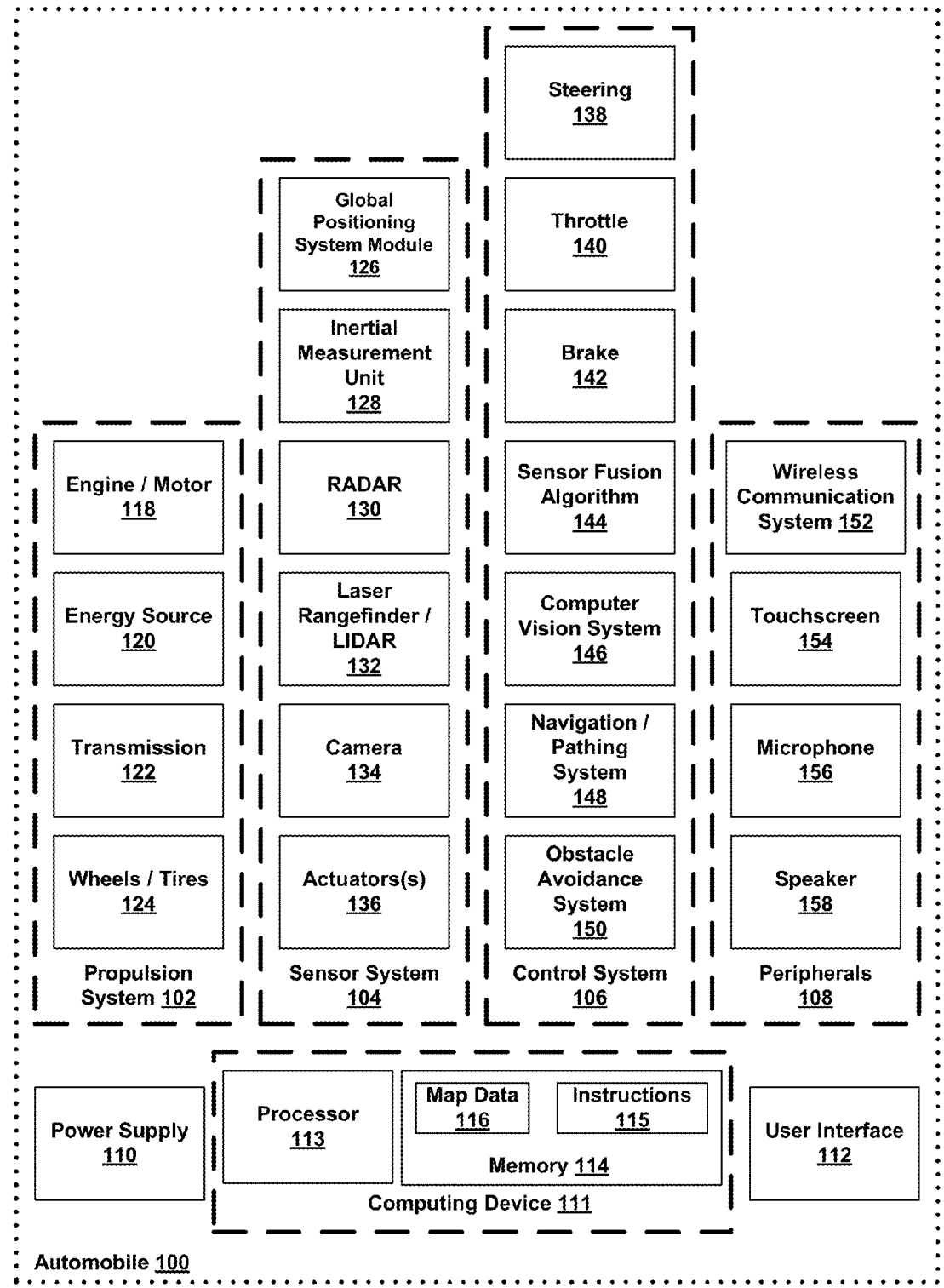
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A vehicle, such as an autonomous or driverless vehicle, may be configured to detect road curbs and/or other boundaries in the local environment of the vehicle during navigation. In particular, a vehicle may operate based on instructions provided by a vehicle computing system, which may receive and process data representative of the vehicle's environment from sensors, such as LIDAR, RADAR, and/or other types of sensors. The vehicle's computing system may use data representative of the environment to detect and locate objects (e.g., road curbs) near the vehicle. Through object detection, including detecting and locating road curbs and/or other road barriers, the computing system may navigate the vehicle safely and efficiently, preventing possible collisions with objects or other vehicles, for example.

In an example implementation of road curb detection, a vehicle (e.g., autonomous vehicle) may include a computing system configured to perform a method designed to detect and locate road curbs and/or other barriers in the vehicle's environment. For one portion of the example method, the computing system may receive multiple sets of data captured and provided by one or multiple sensors associated with the vehicle. The sensors may capture and provide data representative of the vehicle's environment to the computing system in various forms. For example, the computing system may receive point clouds from a LIDAR module associated with the vehicle. The point clouds may be collected in an incremental order as the vehicle navigates a path and may include data points that represent various objects and/or surfaces in the environment of the vehicle at a given timepoint. In addition, respective point clouds may also have associated position information indicative of a position of the vehicle at the given timepoint.

After receiving one or multiple sets of data, the computing system may process the point clouds into an overall accumulated data format (e.g., a dense point cloud representation) based on respective associated position information of the point clouds. For example, the computing system may fuse the point clouds into a dense point cloud representation that aligns the data points of the point clouds in an order that properly reflects the vehicle's environment (e.g., the incremental order).

In particular, the data points may be arranged in the dense point cloud representation based on various factors, such as the location and position of objects that the data points represent, etc. In some instances, the computing system may update (or modify) the dense point cloud representation to include additional point clouds recently received from vehicle sensors. By update or modifying the dense point cloud representation, the computing system may continue to detect and locate road curbs or other objects using the dense point cloud representation in the local environment of the vehicle as the vehicle changes position/location during navigation.

In an addition, the vehicle's computing system executing the example method may perform a road curb detection process, which may include determining features of the dense point cloud representation. Determining features of the dense point cloud representation may involve the computing system analyzing sets or distributions of data point as presented by the dense point cloud representation for features that may likely indicate that data points represent a segment or portion of a road curb and/or another road barrier. The computing system may use various computer vision techniques or other processing software to identify and extract features of any data points accumulated by sensors and/or formatted into the dense point cloud representation that may possibly represent road curbs or other barriers for analysis. Similarly, the computing system may implement software or techniques relating to object recognition, pose estimation, or computer vision to detect data points or features that may correspond to objects in the local environment (e.g., road curbs).

In some instances, the computing system may analyze all the data points provided by the dense point cloud representation, but the computing system may also analyze a subset or multiple subsets of data points in other instances as well. Furthermore, other examples of data selection for detecting objects, including road curbs, may exist.

In some example implementations, the vehicle's computing system may determine a variety of features using the data acquired by vehicle sensors (e.g., the dense point cloud representation), which may include determining a slope of given data points (e.g., a set or distribution of data points) and an elevation profile of the given data points, for example. Likewise, the computing system may determine or estimate an angle of incidence of a collection of a set of given data points or may be configured to determine of a range of detection of the given data points.

In one example implementation, the computing system may determine the features based on a cost associated with finding each feature. In some examples, the cost may be related to processing power or time required to extract a feature. In other examples, the cost may be related to the accuracy of extracting the feature (e.g., higher cost features are more accurate). For one such example, the computing system may analyze a set of data points based on estimating an inexpensive feature. Depending on whether the set of data points exhibits the inexpensive feature possibly indicative of a road, the computing system may proceed to determine other features based on the data points or may select a new set of data points to analyze.

In addition, in some instances, the computing system may extract multiple features using the dense point cloud simultaneously, which may involve determining multiple features at the same time for a given distribution or set of data points. The computing system may also determine features based on a predefined order, which may depend on various factors, for example. The computing system may determine features based on confidence levels associated with particular features.

During operation, a vehicle's computing system may provide determined features to a classification system (e.g., a classifier, server, etc.), which may be configured to output an estimate of whether the features are representative of a road curb (e.g., segment of a road curb) or evident of multiple road curbs positioned on multiple sides of the vehicle, for example. The classification system may exist as a part of the computing system of the vehicle or may exist as a separate entity (e.g., a server). The classification system may process the different features and determine whether a road curb may exist within the local environment of the vehicle, for example.

In addition, the computing system may provide the features and/or other data (e.g., the dense point cloud representation) to the classification system in real-time and may enable the classification system to efficiently provide outputs back to the computing system indicating whether or not sets or distributions of data points may represent road curbs in the vehicle's local environment.

Furthermore, the computing system may determine whether any analyzed data points, such as the given data points, represent one or multiple road curbs in the environment of the vehicle based on an output or outputs of the classification system. The computing system may be configured to use the data to estimate a location of any road curbs or other objects relative to the vehicle. In some instances, the computing system may provide instructions to control systems of the vehicle to navigate the vehicle based on a control strategy that accounts for nearby road curbs or other boundaries (e.g., avoid road curbs). A vehicle may navigate safely and efficiently through detecting and locating road curbs and/or other objects positioned in the local environment.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be traveling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well.

The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
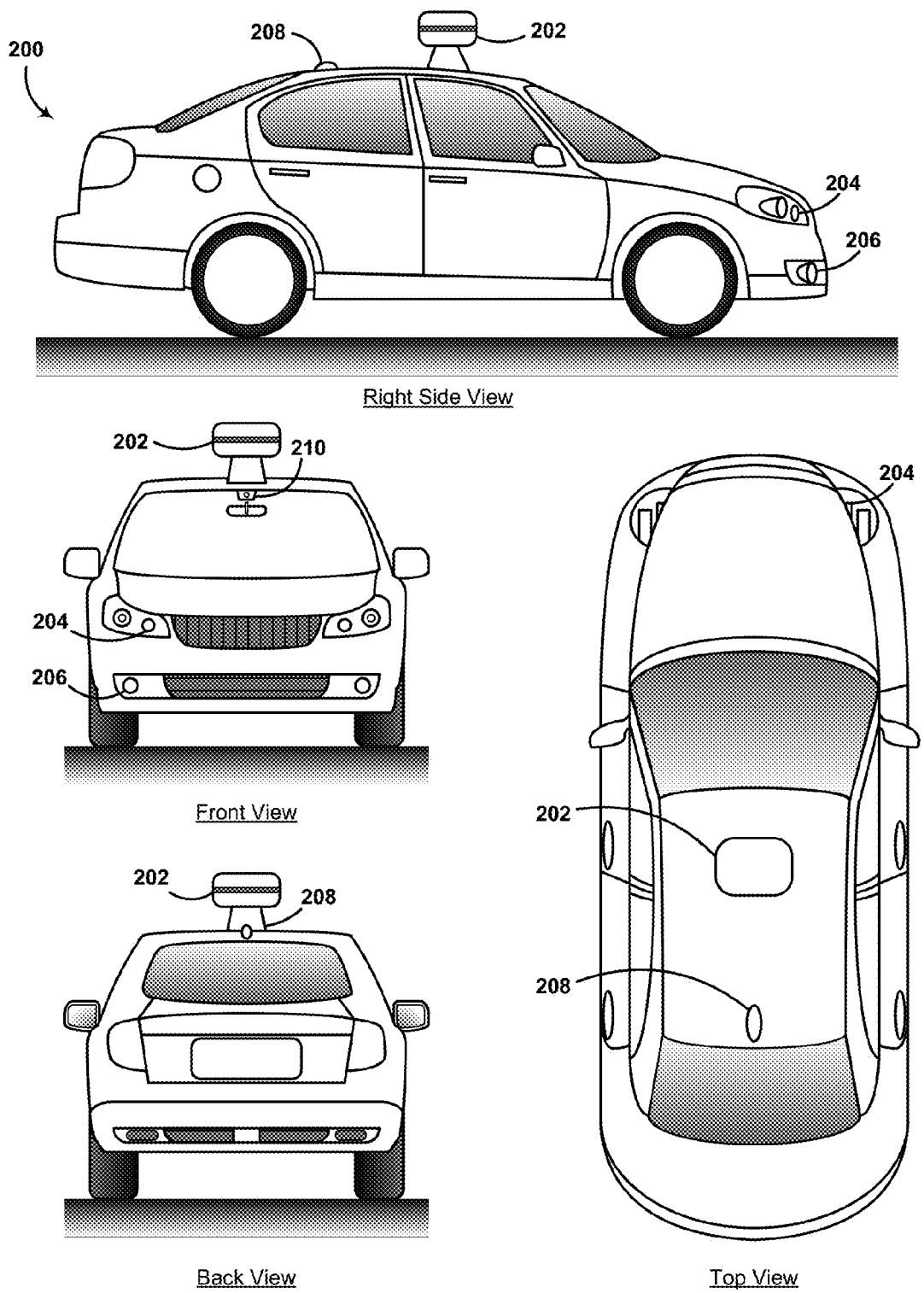
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
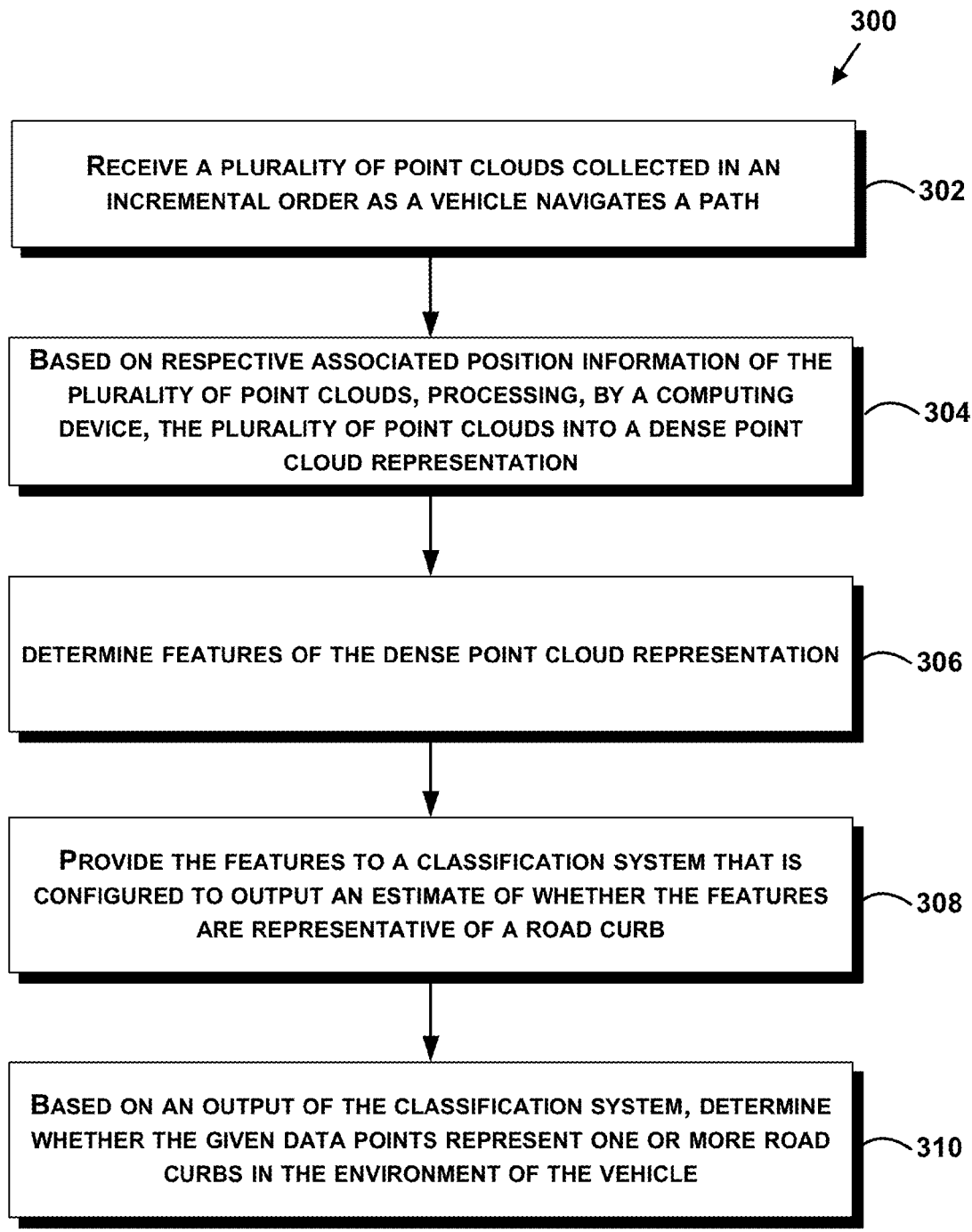
FIG. 3 is a flow chart of an example method for detecting road curbs.

FIG. 3 is a flow chart of an example method 300 for detecting road curbs. The method 300 may include one or more operations, functions, or actions as illustrated by one or more blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be a vehicle, such as the example vehicle 200 illustrated in FIG. 2. Alternatively, the computing device or system that executes some or all of the stored instructions could be another computing device or system, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. The vehicle may be autonomous, partially autonomous, or controlled completely by a user, for example. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 may include receiving a plurality of point clouds collected in an incremental order as a vehicle navigates a path. In particular, each point cloud may include data points that represent the environment of the vehicle at a given timepoint and has associated position information indicative of a position of the vehicle at the given timepoint.

Within example implementations, the method 300 may be executed by various types of vehicles, which may be equipped with a variety of sensors configured to capture data representative of the local environment of the vehicle. In particular, an example vehicle executing the method 300 may include a LIDAR module, RADAR module, stereo camera system, and/or other types of sensors capable of capturing information about the vehicle's environment. The data obtained by sensors may be useful for object detection, determining navigation routes, etc. A vehicle may be configured to acquire data from the various sensors and utilize the data to efficiently navigate safely, preventing potential collisions and obeying lane boundaries, traffic signals, etc.

An example vehicle executing the method 300 or a similar process may receive the data representative of the vehicle's environment from the sensors in various formats. For example, a vehicle's computing system may receive data in the form point clouds from LIDAR. A LIDAR module may project lasers to image objects in the vehicle's environment and capture the returns of the projected lasers using one or multiple sensors. The projected lasers may bounce off different surfaces of objects in the environment and enable the LIDAR module to obtain measurements relating to the environment. In particular, LIDAR may provide data points in the form of a three-dimensional point cloud to a vehicle's computing system. The data points may represent the position, orientation, and/or structure of objects in the environment relative to the LIDAR module positioned on the vehicle. Through analyzing the data points, the vehicle's computing system may determine distances between objects, including distances between objects and the vehicle, for example. LIDAR may acquire information for the vehicle to utilize in other ways as well.

In one example implementation, as the vehicle navigates a path, the computing system of the vehicle may receive a series or multiple point clouds in an incremental order from the LIDAR module of the vehicle. The received point clouds may include data points that represent the nearby environment, which may depend on a position and/or orientation of the vehicle at a certain timepoint relative to the environment. As the vehicle changes position or orientation during navigation, the LIDAR module may continue to capture point clouds that include data points corresponding to objects in the environment based on the new position and/or orientation of the vehicle and may further provide the newly acquired data to the vehicle's computing system.

In addition, the computing system may be configured to associate a timepoint and/or position with each point cloud received from the LIDAR module, which may assist the computing system in arranging the point clouds to properly represent the positions and orientations of objects in the environment. This way, the associations may enable the computing system to keep track of the point clouds or arrange the points clouds based on the movement of the vehicle (e.g., align the data points to properly reflect the positions of objects in the environment). The computing system may associate other information with received point clouds as well.

In some instances, the computing system may receive data in other formats from vehicle sensors. For example, a computing system may receive a series of images captured by a camera system (e.g., stereo cameras). The computing system may use the series of images for object detection and/or location as well. In addition, the vehicle's computing system may receive and utilize images of the environment as well as data captured by other sensors (e.g., LIDAR). In another implementation, a vehicle's computing system may receive data representative of the local environment using RADAR. The variety of sensors may be configured to supplement information captured by other sensors and systems of the vehicle.

In addition, during operation as sensors capture and provide data to the vehicle's computing system, the system may be configured to store the data in memory, which may exist on or off the vehicle (e.g., located on a server). The computing system may also process the data in real-time as the system receives the data, for example.

At block 304, the method 300 may include, based on respective associated position information of the plurality of point clouds, processing, by a computing device, the plurality of point clouds into a dense point cloud representation. During operation, a computing system of the vehicle may process received point clouds (or a subset of the received point clouds) into a dense point cloud representation, which may enable more efficient object detection by vehicle systems. The computing system may determine that multiple point clouds may be identical and filter the point clouds prior to formulating the dense point cloud representation. Likewise, the computing system may also remove data indicative of noise that may affect the effectiveness of a dense point cloud representation. In some cases, the computing system may require that data noise exceed a threshold level prior to removing the data indicative of noise from the rest of the data.

As indicated, a vehicle's computing system may format received information into a dense point cloud representation or other accumulated system to enable the analysis of multiple point clouds (e.g., multiple frames of data) in an aggregated totality rather than requiring analyzing multiple point clouds separately. The dense point cloud representation may enable the computing system to extract information that may not be obtainable using a single point cloud of data, such as road curbs, for example. The computing system may format the data into a dense point cloud representation to better reflect the position and/or orientation of objects in the environment of the vehicle.

In an example implementation, the computing system may process received point clouds into a dense point cloud representation by accumulating multiple point clouds and processing the point clouds into the representation. During operation, the vehicle sensors (e.g., LIDAR) may provide the new point clouds representative of the environment to the computing system, which may accumulate the point clouds for processing.

In some instances, the vehicle's computing system may identify any differences between respective point clouds in the plurality of point clouds, which may occur prior or after the generation of the dense point cloud representation. For example, the computing system may identify differences that may arise from obtaining the point clouds from different positions or orientations in the environment. The computing system may process the point clouds into a dense point cloud representation and modify the dense point cloud to reduce any determined differences.

Likewise, the computing system may process received point clouds into a dense point cloud representation and identify data points that correspond to the same object or surface, for example. The computing system may modify the dense point cloud representation to ensure that data points corresponding to the same objects align properly, which may involve adjusting the dense point cloud representation based on the timepoint point clouds had been acquired or associated position information, for example.

In another implementation, a vehicle's computing system may configure data provided in received point clouds into a different accumulative format, such as a statistical representation, for example. The dense point cloud representation, statistical representation, or data points positioned in another format may exist in two-dimensions or three-dimensions, for example. In addition, the computing system may develop or generate multiple dense point cloud representations as well, which may be based on different positions of the vehicle or objects relative to the vehicle, etc.

Furthermore, a computing system of the vehicle may update or modify the dense point cloud representation as the system receives additional data (e.g., new point clouds) during navigation. For example, as the vehicle navigates a path of travel, the vehicle sensors may continue to acquire data corresponding to the environment based on the new position and orientation of the vehicle. The computing system may configure the newly received data into the previously developed dense point cloud representation. In such an example, the computing system may continuously update the dense point cloud representation to reflect any received data provided vehicle sensors.

At block 306, the method 300 may include determining features of the dense point cloud representation. A computing system of the vehicle performing the method 300 may be configured to execute a road curb detection time, which may involve determining features of data in the dense point cloud representation that may indicate that the data may likely represent a road curb. In particular, the computing system may determine features of data in the point cloud representation that may indicate which sets or distributions of data, if any, may correspond to a road curb segment or other type of barrier, for example. In some instances, the computing system may be unable to find any features indicative of a road curb using the data provided in the dense point cloud representation since the vehicle may be in an environment without any road curbs or other road barriers, for example.

Within example implementations, using data accumulated and provided by the vehicle sensors (e.g., the dense point cloud representation), a vehicle's computing system may utilize various techniques and/or software applications to extract features that may assist in the detection and locating of road curbs in the vehicle's environment. The features may enable the computing system (or another entity) to identify data points that may possibly represent road curb structures. The features, in particular, may be indicative of the structure, position, and/or orientation of a road curb rather than other types of objects. Likewise, the computing system may extract features that may indicate which data points may correspond to other types of road barriers, such as guard rails, for example.

To determine the features, the computing system may analyze the data as accumulated and provided within the dense point cloud representation. In some instances, the computing system may use individual point clouds or other data captured and provided by the vehicle sensors to assist in detecting road curbs. The features extracted by the computing system may enable the computing system or another device (e.g., a classification system) to identify data possibly indicative of road curbs and further determine the position and/or orientation of the road curbs relative to the vehicle in the local environment.

In an example implementation, to estimate or extract features that may enable road curb detection, a vehicle's computing system may evaluate sets (e.g., distributions) of data points within the dense point cloud representation to determine if the sets exhibit features that may be representative of a road curb or other type of road barrier (e.g., proper size, position, etc.). Within examples, a computing system may extract various features, which may depend on environment factors or a confidence associated with the road curb detection. For example, the computing system may determine additional features to increaser the confidence level associated with identifying data points that may possibly be indicative of a road curb.

In order to estimate or extract features from local data representative of the environment as acquired by vehicle sensors, a vehicle's computing system may analyze all gathered data points or may analyze a subset of captured data points. The computing system may use the developed dense point cloud representation to estimate or extract features that may assist in detecting road curbs in the vehicle's environment. During operation, the computing system may determine, measure, or estimate the features simultaneously using a single processor or multiple processors, for example.

Similarly, the computing system may be configured to extract multiple features of information for different distributions of data points in the dense point cloud representation at the same time period of operation. The computing system may be configured to use a sliding window scan or another technique to identify particular sets or distributions of data points to analyze for extracting features that may assist in identifying road curbs in the environment of the vehicle.

In addition, in some implementations, the computing system may utilize other entities to assist in extracting features, such as classifiers, processors, or servers. The computing system may extract features in a specified order or may determine the features randomly. Determining the features randomly may involve the computing system attempting to retrieve the different features immediately upon development of the dense point cloud representation. The computing system may also determine more or less features within other examples. In some instances, a vehicle's computing system may determine features using information provided by sensors in other formats, such as images or range-maps, for example.

In one example implementation, in order to select data points for feature-analysis, the computing system may use computer vision and/or image analysis techniques. In addition, the computing system may factor in the orientation and/or position of the vehicle when determining which data points to use for extracting features. The computing system may use other techniques to identify data points in the dense point cloud representation that may correspond to a road curb as well.

As indicated, a vehicle's computing system may extract, estimate, measure, or determine through other techniques any number of features. The features described herein are merely for example purposes and may be executed using other techniques. In addition, a computing system may extract other features that may assist with local road curb detection within other implementations.

For one example feature, a vehicle's computing system may be configured to determine a slope of a set or multiple sets of data points. The computing system may use the data as provided within the dense point cloud representation (or data in another format) to determine a slope of one or multiple sets (e.g., distributions) of data points representative of objects or surfaces in the local environment. Determining a slope of particular sets of data points may enable the computing system to determine if the particular sets of data points (e.g., data points distribution) may correspond to a road curb, a part of the road, or another object, for example.

The computing system may determine the slope of multiple sets of data points that may possibly correspond to a road curb or similar structure. Likewise, the computing system may also estimate the slope based on a predefined confidence level. In such an example, the vehicle's computing system may be configured to estimate the slope of a given set of data points within a threshold degree of accuracy. Further, the computing system may estimate the slope of a distribution of data points or other features utilizing a buffer-forgiveness factor, which may enable the features to be extracted based on close, but not exact results, for example.

In order to determine the slope of a set of data points, a vehicle's computing system may configure a local plane to fit to the selected data points and use the configured local plane to determine an approximate slope of the data points. In such an example, the computing system may estimate a slope for the set of data points based on determine a slope of the local plane fit roughly to the data points. The computing system may also utilize the quality of the plane fit to the data points, which may assist in road curb detection. In some implementations, various components may be configured to determine the slope of a set of data points, which may include using a processor, computing device, or classifier, for example. The different components may execute in a variety of techniques to configure to a local plane to data points in order to obtain slope information. In addition, the computing system may extract or estimate the slope from a set of data points using other techniques that may not involve the use of fitting a slope to the data.

Furthermore, the computing system of the vehicle may repeat the slope identification process for any number of data points or sets of data points (e.g., multiple distributions). The computing system may analyze various sets of data points that may likely correspond to a road curb segment. For example, the computing system may expand a set of data points to include more data points and then figure the slope of the expanded set of data points. The computing system may determine a quality level associated with the slope fit to the data points. The number of data points within the data sets analyzed by the vehicle may vary in size and position within the point clouds or dense point cloud representation in some example implementations.

In addition, the vehicle's computing system may determine or measure a slope of the road that the vehicle is traveling on in some instances. The computing system may use the slope of the road to compare with estimated slopes associated with distributions of data points as provided within the dense point cloud representation, for example. The comparison may provide additional insight to whether the data points may possibly correspond to a road curb. For example, based on the comparison, the computing system may determine that a similar slope may indicate that the data points may be representative of a segment of road curb. Likewise, a nearly identical slope may also indicate that the data points may be a portion of the road and not a road curb. The computing system may extract other information based on comparing slopes of data points and slopes of roads.

In other examples, the computing system may extract a variety of additional information based on determining the slope of sets of data points in the dense point cloud representation. For example, the computing system may provide the slope of one or multiple sets/distributions of data points to a classification system based on whether the slope of the data points is within a threshold variance of a horizontal slope or some other predefined slope used for measurements. Other information may be obtained through estimating slopes associated with sets of data that may correspond to road curbs in the environment.

For another example feature, the vehicle's computing system may also estimate or determine features relating to the elevation information provided by data points. The data points within a dense point cloud representation may include elevation information, which may be based on the position or orientation of the data points relative to other data points received within a point cloud or multiple point clouds.

In some instances, the computing system may determine an elevation profile associated with the same data points used to estimate a slope. In other instances, the computing system may determine elevation information for data points in the dense point cloud representation without analyzing the data points slope. The computing system may contribute elevations to data points based on positioning of the data points relative to the vehicle or relative to other data points.

Using the elevation information, a vehicle's computing system may develop an elevation profile for a set or distribution of data points. For example, a vehicle's computing system may determine an elevation profile of data points (e.g., a set of data points or individual data points) in the dense point cloud representation. The computing system may use an elevation map to link elevation information to data points or may analyze elevation associated with relative positioning of particular data points relative to other data points received within point clouds or other formats of captured information.

In an example implementation, the vehicle's computing system may determine multiple orders of elevation associated with individual data points or a distribution of the data points. A moment may exist as a quantitative measure of the shape of a set of data points. The different moments as determined, may provide the vehicle's computing system with a variety of information relating to the environment. In order to determine the different moments, a computing system may use different techniques or calculations. For example, the computing may determine a second moment associated with a distribution of data points, which may be used to measure the width (in a particular sense) of a set of data points in one dimension, or in higher dimensions measures the shape of a cloud of points as it could be fit by an ellipsoid. Other moments may describe other aspects of a distribution of data points, such as how the distribution may be skewed from its mean. Any distribution of data points may be characterized by a number of features (such as the mean, the variance, and the skewness, etc.).

A computing system may determine several orders of moments associated with data points within the dense point cloud representation or data received in another format. For example, the computing system may determine that the first raw moment may represent the mean of the data points. Likewise, the computing system may determine variance by extracting information relating to the second central moment.

In addition, the computing system may determine a third central moment using the data points, which may exist as a measurement of the lopsidedness of the distribution of data points (e.g., skewness). A distribution of data points that may be skewed to the left (the tail of the distribution is heavier on the left) may have a negative skewness. A distribution that may be skewed to the right may have a positive skewness for the data points. A vehicle's computing system may use skewness information for filtering data points that may correspond to road curbs in the vehicle's environment.

Furthermore, the vehicle's computing system may determine a fourth central moment associated with sets of data (e.g., data distributions) in the dense point cloud representation or other format of accumulated data. The fourth central moment may exist as a measure of whether the distribution of data points is tall and skinny or short and squat, compared to the normal distribution of the same variance. The fourth moment may provide kurtosis information to the computing system. Similar to skewness, kurtosis may provide information about the shape of a probability distribution of data points.

The skewness and kurtosis may represent statistics that a vehicle's computing system may estimate or compute using data points captured by LIDAR and/or other sensors. For example, the computing system may determine the skewness and/or kurtosis of data points within the dense point cloud representation. The skewness and kurtosis may be computed over a distribution or set of data points based on heights of the data points at particular locations. The computing system may be configured to determine that a low skewness and kurtosis likely corresponds to data points representative of a flat surface. In some instances, a low skewness and kurtosis may even correspond to noise measurements from a flat surface, which enables the computing system a buffer amount to still determine flat surfaces. In contrast, a computing system may determine that higher skewness and/or kurtosis values may likely correspond to data points representative of a road curb segment. The computing system may extract features based on the values of skewness and/or kurtosis measured based on a set or sets of data points as captured and provided by vehicle sensors.

A vehicle's computing system may use elevation information relating to a distribution of data points to determine if the data points form a bimodal distribution. Data points positioned in a bimodal distribution may likely represent a structure similar to the structure of a road curb, for example.

In addition, for another example feature, the computing system may determine features relating to angles of incidence for a set or distribution of data points, which may provide information regarding distances between objects or structural information of objects in the environment, for example. An angle of incidence may exist as the angle between projected lasers from LIDAR and the local surface normal at the point of the laser return. The computing system may receive data points within laser returns and estimate an angle of incidence associated with the data points. The computing system may determine that data points representative of a road surface may include a high angle of incidence. For example, the computing system may determine that the data points correspond to an angle of incidence above a predefined threshold.

In some instances, a vehicle's computing system may estimate angle of incidences for data point sets (distributions) through analyzing a variation and maximum intensity information associated with the data captured by the vehicle sensors. In particular, the computing device may analyze the lasers returns as captured by a LIDAR module, for example.

The computing system may determine intensity information associated with laser returns captured by a vehicle sensor. In some instances, the computing system may determine the intensity information based on multiple factors. For example, the intensity information may be extracted based on the reflectance of a surface (e.g., whether the surface is light or dark), a range between the sensor and the surface (e.g., distance between the vehicle and the surface the lasers reflected off), and/or the angle of incidence of the laser off the surface.

The reflectance of a surface may impact the intensity of laser returns captured by a vehicle's sensor. Different types of surfaces may further alter the intensity of laser turns/data points captured by vehicle sensors using LIDAR or similar range-based sensors.

The computing system may also determine the surface property of objects as indicated by the intensity of laser returns as captured by vehicle sensors. The computing system may determine that data points may represent surfaces composed of materials that may be indicative of a road curb (e.g., concrete).

Further, the range of detection may impact the intensity information as captured and provided to a vehicle's computing system. For example, a computing system may measure intensity information that may vary based on varying distances between the vehicle and the surface or objects that the lasers are reflected off. Moreover, the angle of incidence may cause the intensity information received by the computing system to vary. For example, the higher the angle of incidence that occurs between an object and the lasers projected by a LIDAR module, the less energy (e.g., lower intensity) the computing system may receive.

In particular, a computing system may receive higher intensity laser returns for data points captured from road curbs than on road surfaces due to a low angle of incidence that the road curb produces. In contrast, a flat road surface may cause the computing system to receive a higher angle of incidence shown through lower intensity laser returns. In some cases, the computing system may receive more noise associated with intensity values of laser returns since some materials (e.g., reflective lane markers) may cause high intensity returns despite not having the structure of a road curb. Therefore, the computing system may process additional techniques to filter the noise from the laser returns, for example.

The computing system may receive sets of laser returns at varying intensities as a result of accumulating and using data at different locations and positions of the vehicle relative to objects. The computing system may average intensity values for the laser returns of a set of data, for example. Road curbs may include a widely varying distribution according to the data points as well as higher intensity value returns.

In addition, the vehicle's computing system may determine a range of detection of data points. The computing system may analyze a range associated with a set or distribution of data points, for example. The computing system may use the range to analyze if the data points correspond to the same object or similar structured objects. The computing system may alter the size of a data set based on the estimated range of the data points. The range may show the differences of values associated with data points as well.

Referring back to the method 300 shown in FIG. 3, at block 308, the method 300 may include providing the features to a classification system that is configured to output an estimate of whether the features are representative of a road curb. Within examples, a vehicle's computing system may provide any extracted information or features to a classification system to assist in object (e.g., road curb) detection.

Example vehicles may include a classification system that may be configured to use any features extracted from the dense point cloud representation or data in another format to detect road curbs or other objects. In some instances, the classification system may exist as a portion of the computing system of the vehicle or may exist as a separate entity (e.g., another computing device). In one such example, the classification system may exist as a classifier that communicates with the computing system of the vehicle. The classification system may include memory, processors, or other components that may assist the classification system with object detection.

In addition, in some implementations, the classification system may be positioned externally from the vehicle and may communicate wirelessly with the network of computing systems of a vehicle. For example, the classification system may exist on a server that communicates with the computing system of the vehicle.

In an example implementation, a classification system (e.g., a classifier) may implement various algorithms (e.g., software techniques) or other analysis processes to obtain object-detection information based on data provided by the computing system. In particular, the classification system may detect data points that may possibly represent road curbs and/or other road barriers in the local environment of the vehicle. The classifier or classification system may operate based on received instructions and/or other information from a vehicle's computing system.

During operation, a vehicle's computing system may provide any determined features extracted from the dense point cloud representation to the classifier, which may analyze the features to determine if any data points may possibly correspond to objects in the vehicle's environment, such as road curbs. In some instances, the classifier may be configured to specifically analyze the features to detect data points that may correspond to road curb segments or other barriers within the vehicle's environment.

Based on its analysis, a classification system may be configured to use the features to produce an output or multiple outputs that may indicate which data points may possibly correspond to road curbs or other barriers in the environment of the vehicle. The classification system may produce outputs in real-time and may continuously detect data points that may correspond to road curbs as the vehicle continuous to navigate a path of travel.

In an example implementation, a classification system may receive the features and produce, based on the features, an output or outputs indicative of positions and/or locations associated with any road curbs or barriers in the environment of the vehicle. The classification system may produce other outputs as well.

At block 310, the method 300 may further include, based on an output of the classification system, determining whether the given data points represent one or more road curbs in the environment of the vehicle. In particular, within some examples, the computing system may determine any data (as originally captured and provided by vehicle sensors) that may indicate the presence of road curbs or similar structures in the vehicle's environment based on outputs provided by a classifier or another computing entity. The vehicle's computing system may use the outputs as provided by a classification system to locate road barriers (e.g., road curbs) in the vehicle's environment and navigate the vehicle based on the location of road barriers relative to the vehicle. For example, the vehicle may navigate a path of travel based on avoiding a nearby road curb positioned on the side of a road.

The classification system may provide indications or signals that enable a vehicle's computing system to detect the location of any identified road curbs in the environment. The output of the classification system may indicate if road curb segments and/or other boundaries are within the vehicle's environment. The computing system may estimate an approximate location of road curbs in the environment based on data analyze performed by the system and/or classification system.

In an example implementation, a vehicle's computing system may provide instructions to vehicle systems and components to control the vehicle based on detecting the road curbs. For example, the vehicle may navigate a path based on tracking a road curb along the side of the road. Similarly, the computing system may track detected road curbs for other navigational purposes. The vehicle's computing system may receive an output or outputs from a classification system and determine based on the output(s) whether the data points represent a road curb or multiple road curbs in the environment of the vehicle.

The computing system may receive multiple outputs from the classification system. For example, the computing system may receive outputs continuously and navigate based on the outputs. During operation, the computing system may update its route or navigation based on outputs received from the classification system.

In an example implementation, a computing system of the vehicle may execute the functions described for the classification system. The computing system may use the dense point cloud representation to detect and locate local road curbs, for example.

In another example implementation, the computing system of a vehicle may utilize information provided by other techniques and/or devices. For example, the computing system may use information provided by an edge tracing technique, which may further assist in detecting and locating road curbs in the vehicle's environment.

Figure 4:
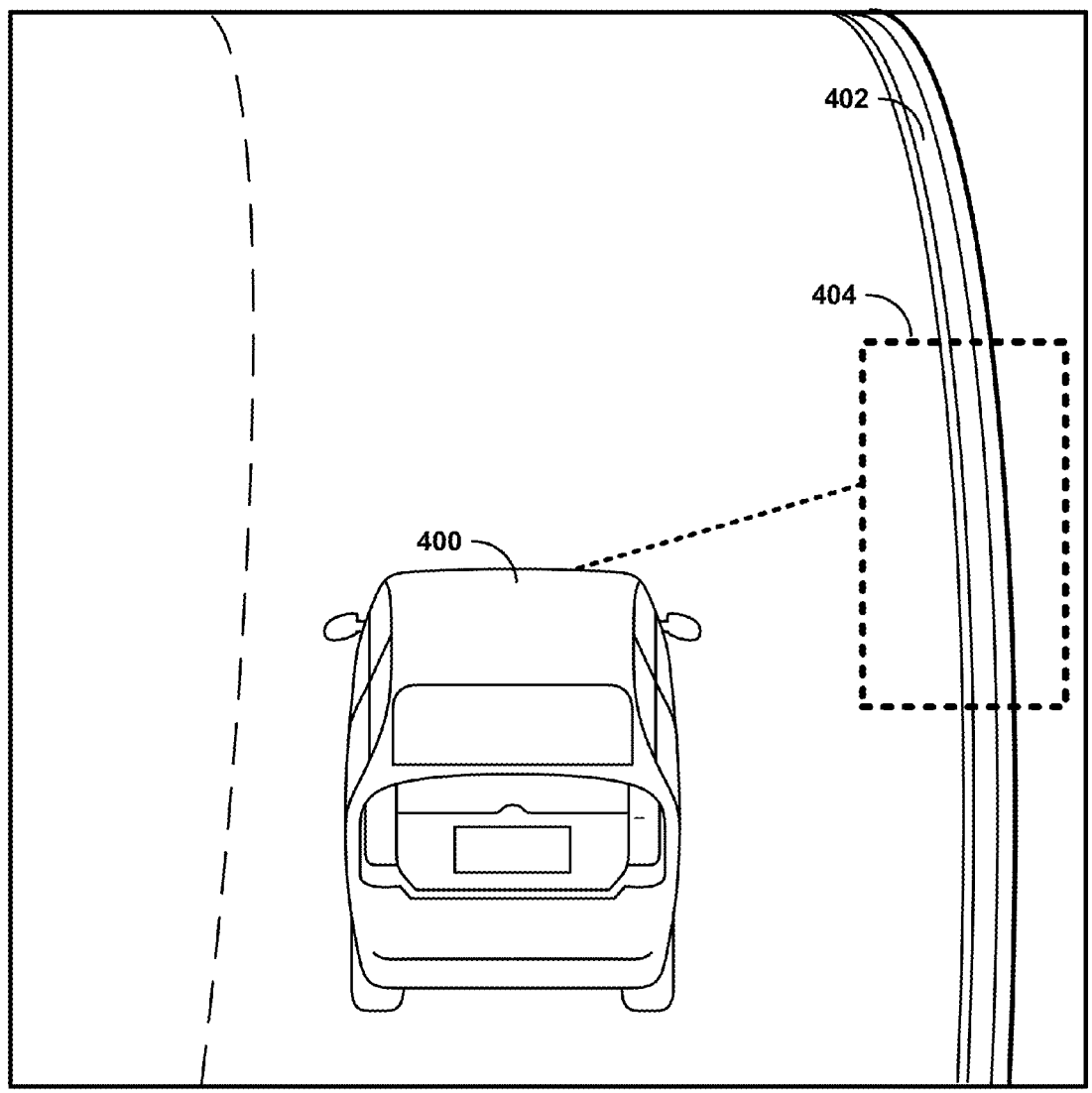
FIG. 4 is a conceptual illustration of an example vehicle detecting a road curb

FIG. 4 is a conceptual illustration of an example vehicle detecting a road curb. In particular, the illustration shows an example vehicle 400 detecting segments of a road curb 402 positioned near the path of travel of the vehicle 400. The vehicle 400 may detect road curbs and/or other objects during navigation using one or multiple vehicle sensors (e.g., LIDAR). In some instances, the computing system of vehicle 400 may detect road curbs in addition to general object detection.

In the conceptual illustration shown in FIG. 4, the example vehicle 400 may use a sensor or multiple sensors to detect segments of a road curb, such as road curb segment 404 of the road curb 402. Likewise, the vehicle 400 may detect segments of multiple road curbs in some instances. In addition, during operation, the vehicle's sensors may detect other objects or boundaries in the environment as well, such as lane boundaries, guard-rails, etc., for example.

In another example implementation, the vehicle 400 may include stereo cameras to capture images representative of the local environment for object (e.g., road curb) detection. The computing system may analyze the images representative of the vehicle's environment to detect objects in the environment, including road curbs or other barriers. The images may supplement data provided by LIDAR or other vehicle sensors, for example.

During navigation, the vehicle's computing system may receive data corresponding to the vehicle's environment. In particular, the computing system may receive data from vehicle sensors (e.g., a LIDAR or RADAR module) that includes data indicative of the road curb segment 404. The computing system may receive the data in the form of a point cloud, which may include any number of data points that are captured based on the position, orientation, and/or structure of the road curb 402. The computing system may analyze the data points in the point cloud to determine a position, orientation, and structure of the segment of road curb 404.

In addition, the vehicle's computing system may use the point cloud of data reflective of the road curb segment 404 to develop a dense point cloud representation that includes data from the point cloud and possibly additional point clouds. The computing system may analyze the dense point cloud representation using various software and/or other techniques to detect data that corresponds to a portion of road curb in the environment of the vehicle 400. The computing system may detect multiple road curbs using a dense point cloud representation, which may include detecting the road curb 402 shown in FIG. 4.

In some implementations, the computing system may provide the dense point cloud representation to a classifier, which may analyze the data using various techniques. The classifier may be physically connected to the vehicle 400 (e.g., located within the computing system) or may be located remotely (e.g., server). Additionally, the computing system may extract features from the dense point cloud representation and provide the features to the classifier. For example, the computing system may extract multiple features that a classifier may utilize to detect and locate a road curb.

A computing system of vehicle 400 may select a set of data to analyze to determine if a road curb is nearby the vehicle 400. The computing system may select the set or sets of data based on a position and orientation of the vehicle 400. For example, the computing system may select the sets of data locally near the ground and sides of the vehicle 400.

The computing system may use the dense point cloud to determine a slope of a set or sets of data points. The slope may be used to determine if the data points may correspond to a segment of a road curb, such as road curb 402. The computing system may determine a slope by fitting a local plane to a set of data points captured within the point clouds. Fitting a local plane or multiple local planes may be based on the data provided by the dense point cloud representation. The computing system may determine a slope associated with the local plane and based on the slope of the local plane, determine the slope of the set of data points.

The computing system may use the slope to assist in detecting segments of road curbs. In some instances, the computing system may compare the slope of data points that may possibly correspond to a road curb segment to the slope of the road. Based on the comparison, the computing system may determine or estimate if the data points may correspond to a road curb segment. The vehicle's computing system may provide the slope of the data points or multiple slopes associated with other sets of data points to a classifier, which may use the information to detect road curbs in the local environment.

Further, the computing system may determine an elevation profile of data points using the dense point cloud representation. Determining an elevation profile may include estimating one or more orders of associated with the data as captured by vehicle sensors. For example, the computing system may analyze the third and fourth orders associated with data in the dense point cloud representation to estimate a skewness and/or kurtosis associated with data points. The skewness and kurtosis may provide an indication of whether the data points possibly correspond to a segment or segments of a road curb or multiple road curbs.

In addition, the computing system may use elevation profile/information of data points to estimate if the data correspond to a bimodal distribution. A bimodal distribution may indicate that the data points may have been captured by LIDAR or another sensor from an object with a structure similar to a road curb. The vehicle's computing system may provide the data points or features relating to the data points to the classifier for further analysis.

In some instances, the vehicle's computing system may track road curbs for positional purposes or other reasons during navigation. For example, the computing system may use road curbs to determine a control strategy that enables the vehicle to navigate safely within the boundaries provide by the road.

Figure 5:
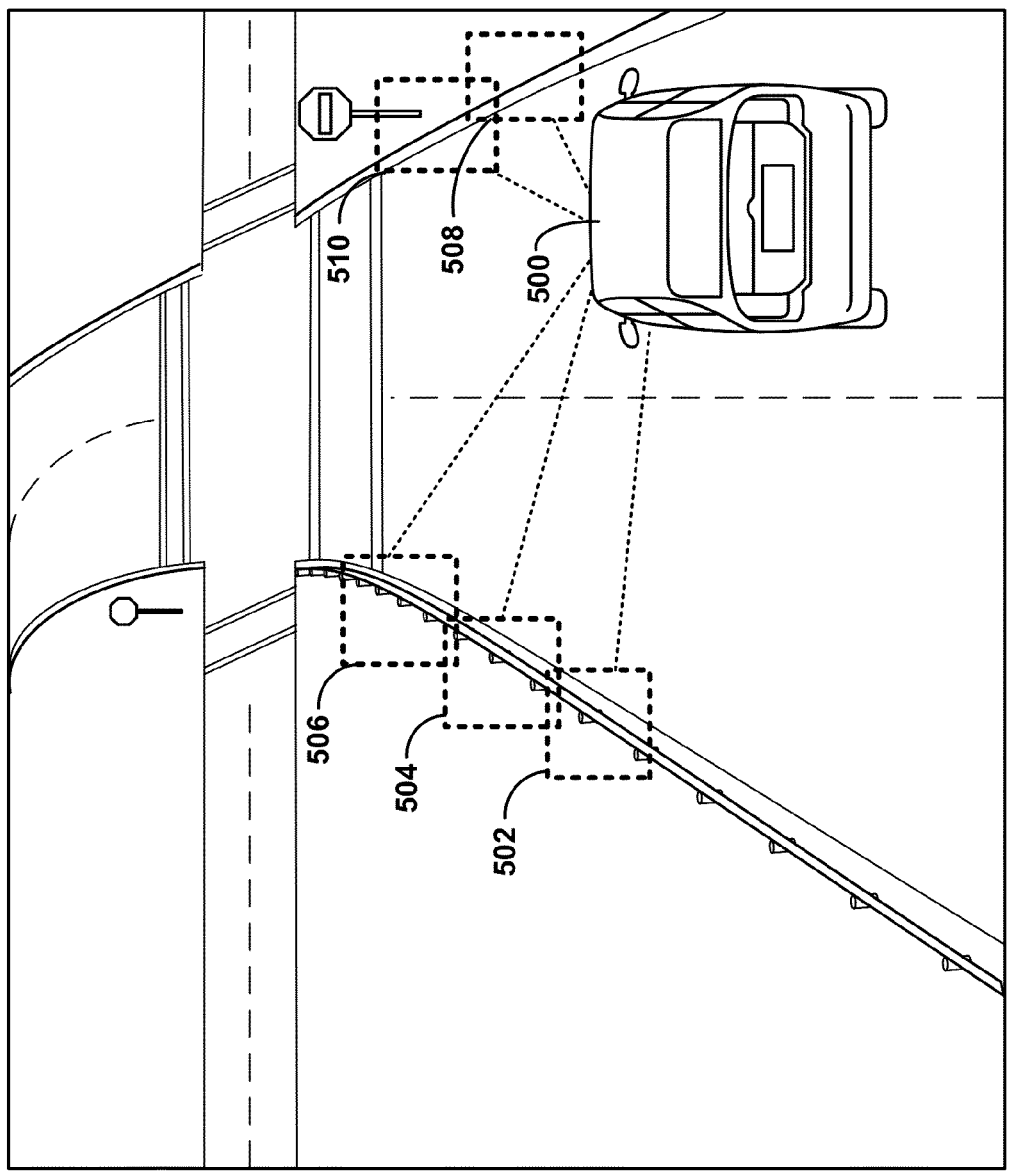
FIG. 5 is another conceptual illustration of an example vehicle detecting road curbs.

FIG. 5 is another conceptual illustration of an example vehicle detecting road curbs. In particular, the example vehicle 500 shown in FIG. 5 is navigating a path of travel on a road while also detecting segments of road curbs located on both sides of the road through the use of vehicle sensors (e.g., LIDAR). The conceptual illustration shows that the example vehicle 500 may be configured to detect segments of road curbs for multiple road curbs, including segments 502-506 corresponding to a road curb on one side of the vehicle 500 and segments 508-510 positioned on the other side of the vehicle 500. Within similar examples, the vehicle 500 may be configured to detect objects in addition to detecting road curbs. However, for example purposes, the conceptual illustration shown in FIG. 5 shows the example vehicle 500 detecting and locating road curbs and no other objects.

In other implementations, a vehicle may be limited to detect road curbs relative to one side of the vehicle or may determine to detect road curb segments relative to only a portion of the vehicle (e.g., only one side). The computing system may detect road curbs and other objects relative to multiple sides of the vehicle.

As shown in example vehicles previously discussed, the vehicle 500 may include a computing system or network of computing devices configured to assist in operations of the vehicle 500, which may include executing control strategies throughout navigation. Control strategies may provide instructions to control systems of the vehicle to navigate a path based on data acquired about the local environment. The vehicle 500 may operate autonomously and may navigate safe paths of travel using vehicle sensors (e.g., LIDAR). For example, during operation, the vehicle 500 may use LIDAR to capture data representative of the local environment in the form of point clouds. The data points that make up a point cloud may provide information relating to the size, structure, orientation, and/or position of objects in the environment. In addition, the vehicle's computing system may determine range information (e.g., distance between the vehicle and objects) based on received point clouds obtained through LIDAR or RADAR, etc.

In the conceptual illustration shown in FIG. 5, as the vehicle 500 navigates, LIDAR may capture a point cloud that includes data points representative of road curb segment 502 and may also capture additional point cloud with data points representative of additional segments (e.g., segments 504-506) of the same road curb in the local environment of the vehicle 500. Concurrently, the vehicle 500 may receive point clouds that include data points corresponding to road curb segments 508-510. The amount of data points and overall sizes of the point clouds may vary within examples and may depend on the LIDAR module itself, for example.

In addition, some sensors located on the vehicle 500 may be configured to capture a range of data points based on the position, orientation, and/or structure of some or all the objects within the vehicle's environment relative to the vehicle. In some examples, specific sensors may be configured to capture data likely corresponding to road curbs (e.g., a LIDAR module positioned to capture data located near the side of roads).

Furthermore, the vehicle's computing system may receive the various point clouds as captured by LIDAR and extract (or estimate) features based on the data points. The features may be useful for detecting and identifying objects in the vehicle's environment. For example, the computing system may analyze features as provided by the data points for features indicative of a road curb.

In some examples, the computing system of vehicle 500 may configure the received point clouds into an accumulated format for analysis (e.g., combine or arrange the point clouds together). In particular, after receiving a point cloud or multiple point clouds, such as the point clouds corresponding to road curb segments 502-510, the vehicle's computing system may generate a dense point cloud representation that utilizes the data points captured within the multiple point clouds. The dense point cloud representation may arrange and provide the data points as originally captured by the vehicle sensors.

During operation, in some cases, the computing system of vehicle 500 may generate multiple dense point cloud representations dependent on the data representative of the environment as acquired by vehicle sensors. For example, the computing system may develop a dense representation for data acquired on one side of the vehicle 500 and may develop another dense representation for the data acquired representative of another side of the vehicle 500. In some instances, various dense point cloud representations may provide data for a specific road curb rather than multiple road curbs.

In contrast, the autonomous vehicle 500 may generate a single dense point cloud representation that encompasses data corresponding to multiple road curbs. In such a case, the vehicle's computing system may use the single dense point cloud representation to detect and identify multiple road curbs.

As previously indicated, a vehicle's computing system may use the multiple point clouds or the dense point cloud representation(s) to extract information or features that may assist in detecting road curbs or other barriers. The computing system may determine various features based on data points in the point clouds and/or the dense point cloud representation. The various features may be based on the structure or positioning of road curbs, for example.

In addition, the reception of data based on objects may vary depending on the position or orientation of the vehicle. For example, the vehicle's computing system may receive a point cloud of a road curb segment 502 prior to receiving a point cloud of a road curb segment 504 since the road curb segment 502 is positioned closer to the vehicle 500. In some instances, the computing system may receive multiple point clouds at the same time (e.g., receive road curb segment 502 and road curb segment 504 at the same time). In such an instance, the computing system may receive the multiple point clouds close together or at the same time as a result of the vehicle navigating a path of travel at a high speed (e.g., the vehicle is changing position quickly). A dense point cloud representation may reflect the order in which data may have been accumulated by vehicle sensors or received by the vehicle's computing system.

In some instances, a vehicle's sensors may likely capture data corresponding to objects within a certain range or distance relative to the vehicle. In such an example, the computing system may receive information corresponding to objects closer to the vehicle before receiving additional information of objects captured as the vehicle navigates towards the objects.

Moreover, the different point clouds captured of road curb segments may overlap in some examples. For example, the computing system may receive a point cloud with data reflective of road curb segment 508 and another point cloud with data reflective of road curb segment 510. In such an example, the different point clouds may share some data points that correspond to a portion of the road curb that may have been captured in both point clouds by LIDAR and/or other sensors (e.g., stereo cameras).

In an example implementation, the computing system of vehicle 500 may determine the features simultaneously or may determine features in a predetermined order. Likewise, the computing system may determine additional features or less features within other implementations.

In addition, the computing system may provide the features, specific data points, point clouds, or other information to a classifier system. The vehicle's computing system may provide the features to a classifier, which may use the features to detect road curbs within the vehicle's environment. The classifier may exist as a classification system may analyze received features and/or data to detect road curbs in the local environment of the vehicle 500. The classification system may provide outputs to the computing system of the vehicle 500 that indicate information relating to road curbs and/or other objects in the local environment. The vehicle 500 may execute a control strategy based on the position and/or orientation of the detected road curbs relative to the vehicle.

Figure 6:
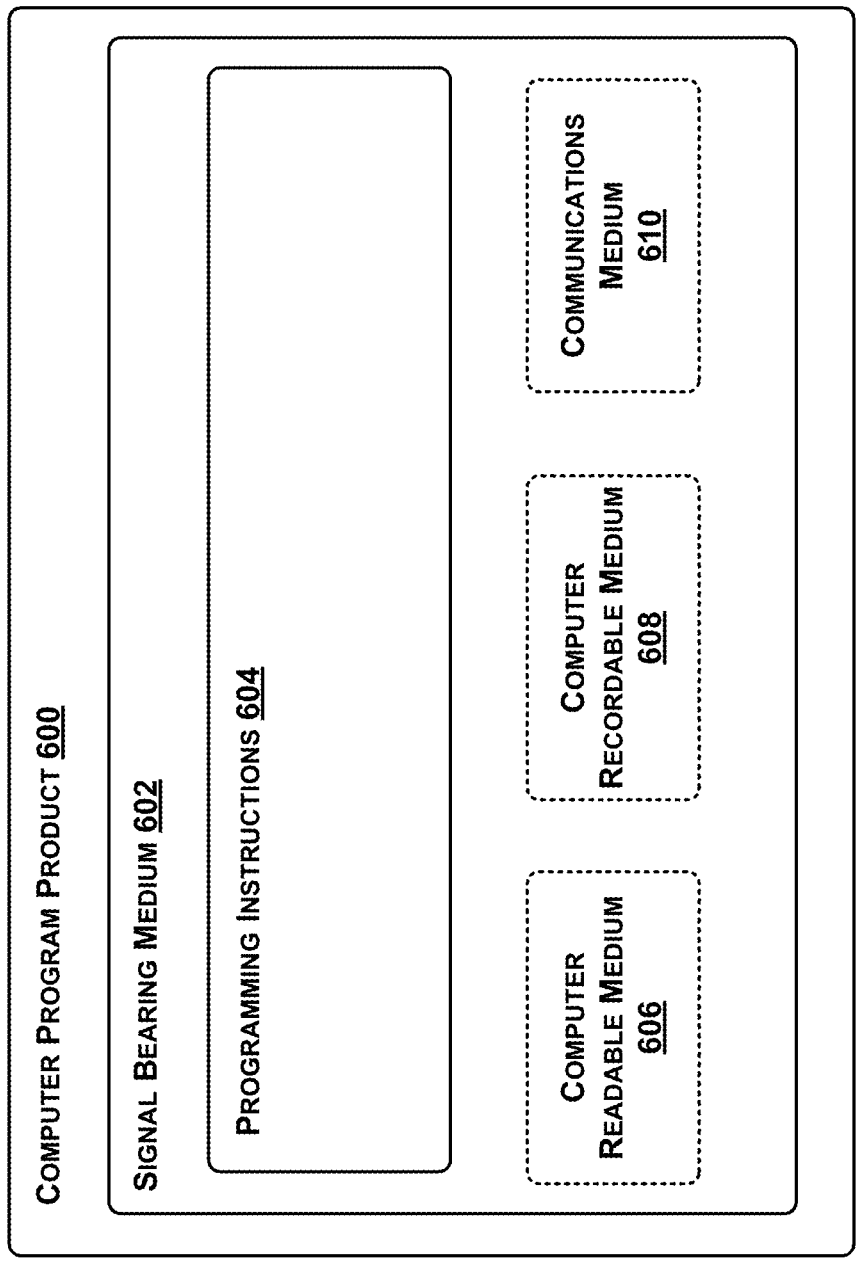
FIG. 6 is a schematic illustrating a conceptual partial view of an example computer program product that includes a computer program for executing a computer process on a computing device.

FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-3 and FIGS. 4A-4D. In some examples, the signal bearing medium 602 may encompass a computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the processor 112 of FIG. 1 may be configured to provide various operations, functions, or actions in response to the programming instructions 604 conveyed to the processor by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a device, such as the device 100 illustrated in FIG. 1. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

The invention claimed is:

1. A method of detecting a road curb in an environment, the method comprising:
   receiving a plurality of point clouds collected in an incremental order as a vehicle navigates a path, wherein a given point cloud comprises data points representative of the environment of the vehicle at a given timepoint and has associated position information indicative of a position of the vehicle at the given timepoint;
   based on respective associated position information of the plurality of point clouds, processing, by a computing device, the plurality of point clouds into a dense point cloud representation;
   identifying, using the dense point cloud representation, given data points having a distribution indicative of a physical structure of a potential road curb;
   determining features using the given data points of the dense point cloud representation for determination of whether the given data points correspond to one or more road curbs in the environment, wherein the features include:
      an elevation profile indicating a height and a slope of data points of the distribution relative to a ground level of the environment; and
      an angle of incidence of a collection of the given data points;
   providing the features to a classification system that is configured to output an estimate of whether the features are representative of a road curb; and
   based on an output of the classification system, determining whether the given data points represent one or more road curbs in the environment of the vehicle.

2. The method of claim 1, wherein determining the slope of data points of the distribution comprises:
   configuring a local plane to fit to the data points;
   determining a slope of the local plane fit to the data points; and
   based on the slope of the local plane, determining the slope of the data points, wherein the slope is indicative of a quality level associated with the local plane fit to the data points.

3. The method of claim 1, further comprising:
   determining a second slope of a road in the environment of the vehicle, wherein the vehicle is navigating on the road;
   performing a comparison between the slope of the given data points and the second slope of the road; and
   based on the comparison, determining if the given data points represent one or more road curbs.

4. The method of claim 1, further comprising:
   determining if the slope of the given data points is within a threshold variance of a horizontal slope; and
   based on the determination, determining if the given data points represent one or more road curbs.

5. The method of claim 1, wherein determining an elevation profile of the given data points comprises analyzing respective heights of the given data points from ground level.

6. The method of claim 1, wherein the elevation profile of the given data points is indicative of whether the given data points are configured in a bimodal distribution, wherein data points configured in a bimodal distribution represent a structure of a road curb.

7. The method of claim 1, wherein the elevation profile of the given data points includes information corresponding to skewness and kurtosis associated with the given data points; and
   based on the skewness and kurtosis associated with the given data points, determining that the given data points represent a structure indicative of a road curb.

8. The method of claim 1, wherein determining an angle of incidence of a collection of the given data points comprises:
   determining one or more angles between a plurality of lasers used to capture the collection of the given data points and one or more surfaces in the environment, wherein the plurality of lasers reflect off the one or more surfaces; and
   estimating an angle of incidence of the given data points based on the one or more angles.

9. The method of claim 1, further comprising:
   determining whether the angle of incidence of the collection of the given data points is higher than a predefined threshold; and
   based on the determination, estimating that the collection of the given data points represent one or more road curbs.

10. The method of claim 1, further comprising:
    receiving, via a sensor, the given data points in a plurality of laser returns;
    determining a range associated with the plurality of laser returns; and
    based on the range associated with the plurality of laser returns, determining the range of detection of the given data points.

11. The method of claim 1, wherein determining the range of detection of the given data points comprises:
    measuring intensity of returns of a plurality of lasers used to capture the given data points, wherein measuring the intensity of the returns comprises using at least one sensor; and
    based on the intensity of the returns, determining the range of detection of the given data points, wherein the range of detection is indicative of the distance between the vehicle and one or more objects that correspond to the given data points.

12. The method of claim 1, wherein determining features using the given data points of the dense point cloud representation comprises:
    determining one or more features of the dense point cloud representation based on a cost associated with respective features of the one or more features, wherein the cost is based on processing power required to determine a given feature and respective features associated with a lower cost are determined prior to the respective features associated with a higher cost.

13. The method of claim 1, wherein determining the given data points comprises using one or more of computer vision, object recognition, and pose estimation to identify the given data points in the dense point cloud representation to analyze in order to detect if one or more road curbs are in the environment of the vehicle.

14. The method of claim 1, wherein processing the plurality of point clouds into a dense point cloud representation comprises:
   accumulating the plurality of point clouds from a sensor of the vehicle;
   aligning the data points of the plurality of point clouds into the dense point cloud representation, and
   wherein determining features of the dense point cloud representation comprises determining features based on a subset of data of the dense point cloud, wherein the subset of data is indicative of data corresponding to one or more edges of a road the vehicle is traveling on.

15. The method of claim 1, wherein processing the plurality of point clouds into a dense point cloud representation comprises:
   determining differences between respective point clouds in the plurality of point clouds;
   processing the plurality of point clouds into the dense point cloud representation; and
   modifying the dense point cloud representation to reduce the determined differences between respective point clouds in the plurality of point clouds.

16. A system comprising:
   at least one processor; and
   a memory having stored thereon instructions that, upon execution by the at least one processor, cause the system to perform functions comprising:
      receiving a plurality of point clouds collected in an incremental order as a vehicle navigates a path, wherein a given point cloud comprises data points representative of the environment of the vehicle at a given timepoint and has associated position information indicative of a position of the vehicle at the given timepoint;
      based on respective associated position information of the plurality of point clouds, processing the plurality of point clouds into a dense point cloud representation;
      identifying, using the dense point cloud representation, given data points having a distribution indicative of a physical structure of a potential road curb;
      determining features using the given data points of the dense point cloud representation for determination of whether the given data points correspond to one or more road curbs in the environment, wherein the features include:
         an elevation profile indicating a height and a slope of data points of the distribution relative to a ground level of the environment;
         an angle of incidence of a collection of the given data points;
      providing the features to a classification system that is configured to output an estimate of whether the features are representative of a road curb; and
      based on an output of the classification system, determining whether the given data points represent one or more road curbs in the environment of the vehicle.

17. The system of claim 16, further comprising:
   providing instructions to control the vehicle based on whether the given data points represent one or more road curbs in the environment of the vehicle.

18. The system of claim 16, wherein determining features using the given data points of the dense point cloud representation comprises determining the features simultaneously.

19. A non-transitory computer readable medium having stored thereon instructions that, upon execution by a computing device, cause the computing device to perform functions comprising:
   receiving a plurality of point clouds collected in an incremental order as a vehicle navigates a path, wherein a given point cloud comprises data points representative of the environment of the vehicle at a given timepoint and has associated position information indicative of a position of the vehicle at the given timepoint;
   based on respective associated position information of the plurality of point clouds, processing the plurality of point clouds into a dense point cloud representation;
   identifying, using the dense point cloud representation, given data points having a distribution indicative of a physical structure of a potential road curb;
   determining features using the given data points of the dense point cloud representation for determination of whether the given data points correspond to one or more road curbs in the environment, wherein the features include:
      an elevation profile indicating a height and a slope of data points of the distribution relative to a ground level of the environment; and
      an angle of incidence of a collection of the given data points;
   providing the features to a classification system that is configured to output an estimate of whether the features are representative of a road curb; and
   based on an output of the classification system, determining whether the given data points represent one or more road curbs in the environment of the vehicle.

20. The non-transitory computer readable medium of claim 19, wherein the dense point cloud representation includes data points corresponding to one or more road curbs positioned on multiple sides of the vehicle.

* * * * *